United States Patent [19]
Chen

[11] Patent Number: 6,098,475
[45] Date of Patent: Aug. 8, 2000

[54] LEVERAGE MECHANISM ACTUATING DEVICE FOR USE IN INITIATING MOTION OF A TOY

[76] Inventor: Hwa-Lo Chen, 4F, No. 15, Sec. 2, Hsin-I Road, Chung-Cheng Dist, Taipei City, Taiwan

[21] Appl. No.: 09/174,449

[22] Filed: Oct. 19, 1998

[51] Int. Cl.$^7$ .............................. F16H 33/20; G09F 19/08
[52] U.S. Cl. ...................................................... 74/3; 40/414
[58] Field of Search ............................ 74/3, 3.2; 40/414, 40/421

[56] References Cited

U.S. PATENT DOCUMENTS

| | | | |
|---|---|---|---|
| 4,245,430 | 1/1981 | Hoyt | 46/266 |
| 4,811,994 | 3/1989 | Friedow | 74/3 |

FOREIGN PATENT DOCUMENTS

| | | | |
|---|---|---|---|
| 62126 | 11/1913 | Austria | 74/3 |

Primary Examiner—David A. Bucci
Assistant Examiner—Chong H. Kim
Attorney, Agent, or Firm—Dickinson Wright PLLC

[57] ABSTRACT

A leverage mechanism actuating device includes a drive member with an output shaft to drive rotatably a rotary body around an axis. A force transmission member is moved relative to the rotary body between first and second positions by a centrifugal force generated by a rotary driving force applied by the output shaft on the rotary body. Movement of the force transmission member enables the force transmission member to convert the rotary driving force into a translational lifting force in a direction parallel to the axis. A leverage mechanism includes a fulcrum, and first and second locations. The first location is associated operably with the force transmission member. The second location is adapted to be connected to a toy. Thus, the first location is actuated by the translational lifting force of the force transmission member to result in a power output at the second location for initiating motion of the toy.

5 Claims, 6 Drawing Sheets

LEVERAGE MECHANISM ACTUATING DEVICE FOR USE IN INITIATING MOTION OF A TOY

BACKGROUND OF THE INVENTION

1. Field of the Invention

This invention relates to a leverage mechanism actuating device for use in initiating motion of a toy, more particularly to a leverage mechanism actuating device with a centrifuging mechanism which can convert a rotational force into a translational lifting force for actuating a leverage mechanism to initiate motion of a toy.

2. Description of the Related Art

A conventional actuating device for initiating motion of a toy usually has a large number of components, such as gears and electrical control circuits, thereby resulting in higher manufacturing and maintenance costs.

SUMMARY OF THE INVENTION

The object of the present invention is to provide a leverage mechanism actuating device with a centrifuging mechanism which has a simple construction that is easy to fabricate at a relatively low manufacturing cost.

According to this invention, a leverage mechanism actuating device includes a drive member with an output shaft. A centrifuging mechanism includes a rotary body which is driven rotatably by the drive member around an axis of the output shaft, and a force transmission member which is moved relative to the rotary body between a first position and a second position radially spaced from the first position by a centrifugal force generated by a rotary driving force applied by the output shaft on the rotary body. Movement of the force transmission member from the first position to the second position enables the force transmission member to convert the rotary driving force into a translational lifting force in a direction parallel to the axis. A leverage mechanism includes a fulcrum, and first and second locations. The first location is associated operably with the force transmission member. The second location is adapted to be connected to a toy. Thus, the first location is actuated by the translational lifting force of the force transmission member to result in a power output at the second location for initiating motion of the toy.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
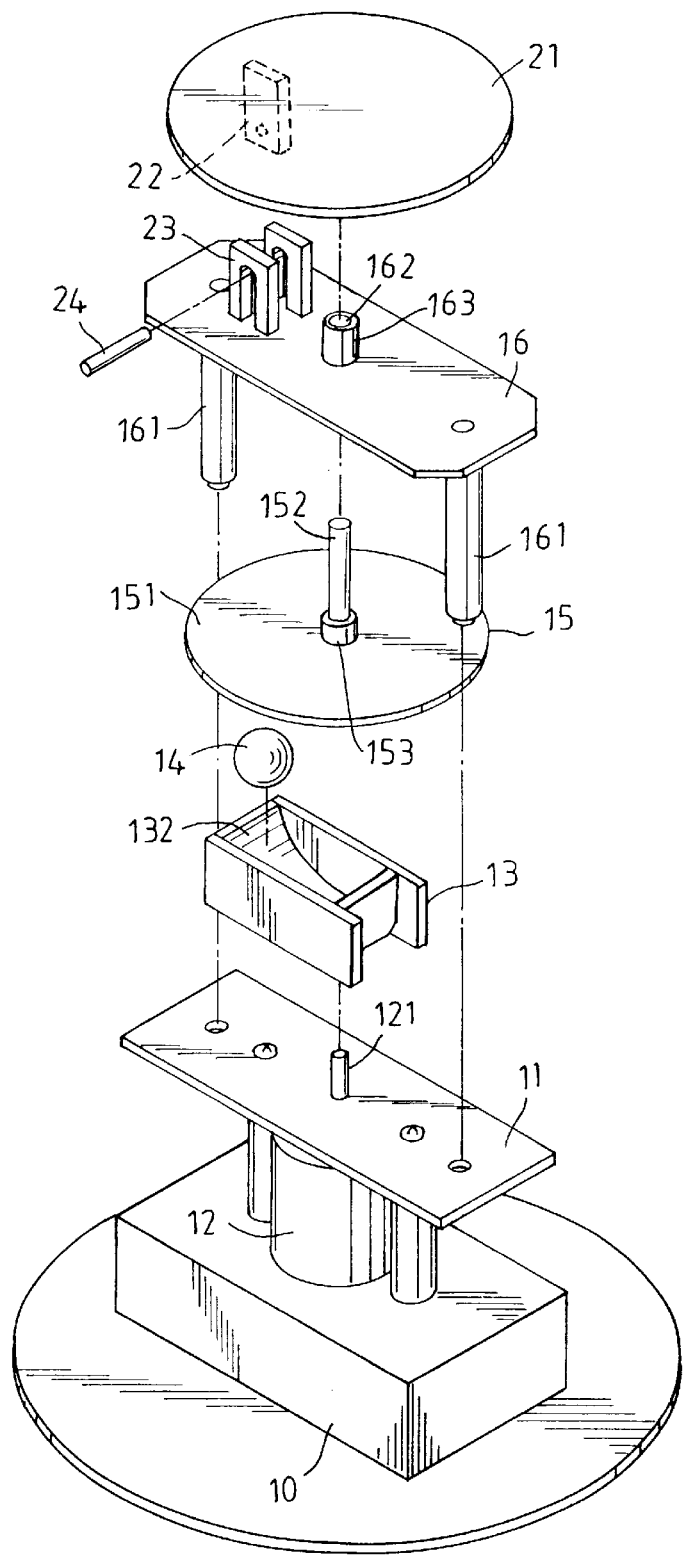
FIG. 1 is an exploded view of a first preferred embodiment of a leverage mechanism actuating device according to this invention.
Figure 2:
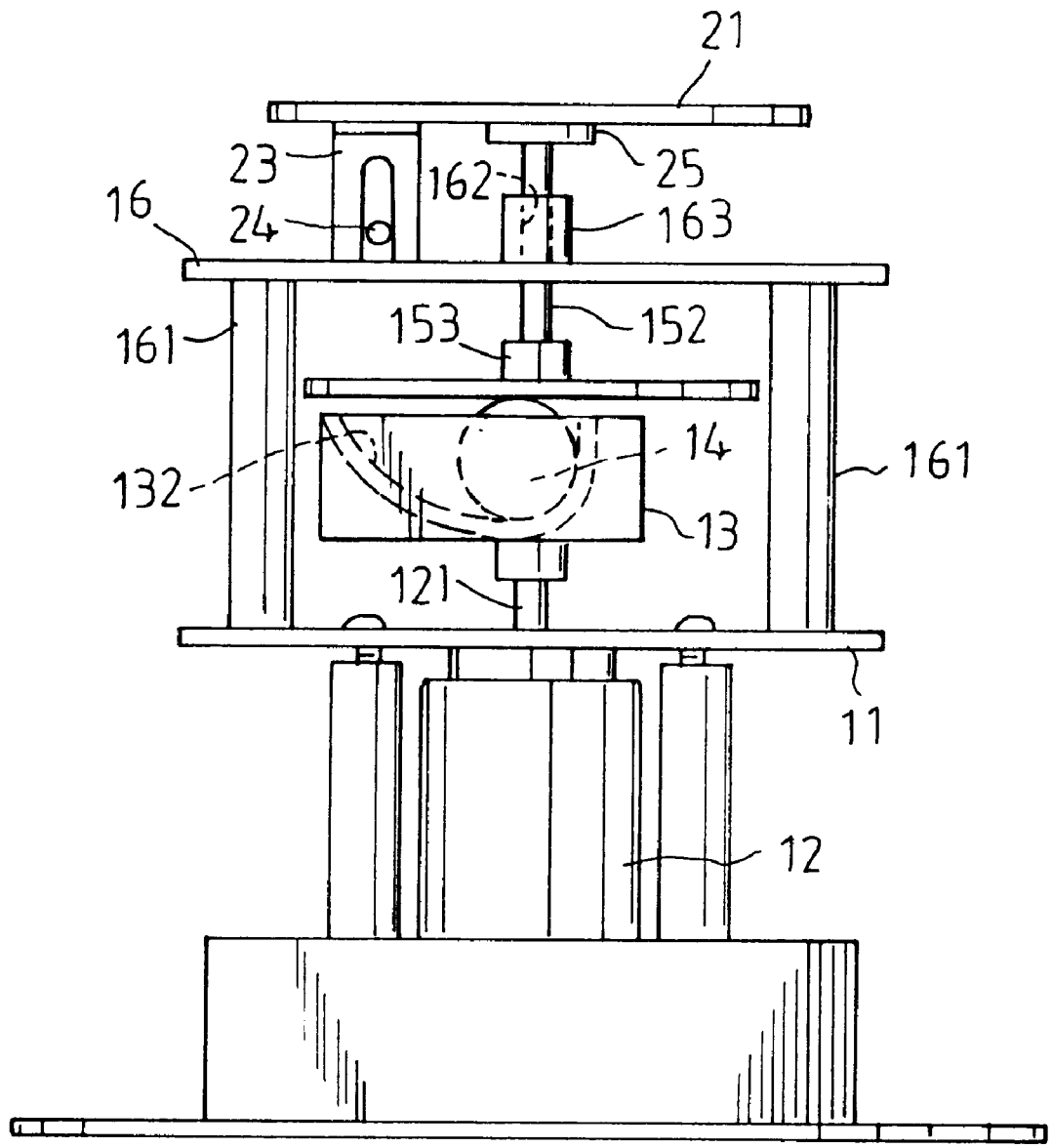
FIG. 2 is a schematic view of the first preferred embodiment.

Referring to FIGS. 1 and 2, the first preferred embodiment of a leverage mechanism actuating device according to the present invention is shown to comprise a drive member, a centrifuging mechanism, a transmitting plate 15, and a leverage mechanism.

The drive member has a base seat 11, and a motor 12 with an output shaft 121 which extends upwardly through the base seat 11 and which defines an axis.

The centrifuging mechanism includes a rotary body 13 which is disposed above the base seat 11 and which is driven by the output shaft 121 to rotate around the axis. The rotary body 13 has an arcuate sloping track face 132 with a lower end to define a first position and an upper end opposite to and extending upwardly from the lower end to define a second position. A ball member 14 serves as a force transmission member, and is disposed rollingly on the sloping track face 132. As such, the ball member 14 can be moved from the first position (i.e. the lower end) to the second position (i.e. the upper end) by a centrifugal force which is generated when the rotary body 13 is driven rotatably by the output shaft.

The transmitting plate 15 includes a circular plate 151 which is disposed above the rotary body 13 to be moved upwardly by the lifting movement of the ball member 14 in a direction parallel to the axis, an actuating member 152 which extends upwardly from the center of the circular plate 151, and a stop member 153 which is sleeved on the actuating member 152 on the circular plate 151.

The leverage mechanism includes a base plate 16 with at least two support stems 161 which are secured on the base seat 11, a center hole 162 for passage of the actuating member 152, and a guiding sleeve 163 which is mounted at the center hole 162 for guiding the movement of the actuating member 152. An engaging seat 23 is secured on the base plate 16. The leverage mechanism further includes a leverage member 21, such as a lid, which has an engaging block 22 to be pivoted in the engaging seat 23 by a pin 24 so as to form a fulcrum. A central protrusion 25 (see FIG. 2) is formed on a bottom surface of the leverage member 21 and is aligned with the guiding sleeve 163 in the direction parallel to the axis of the output shaft 121. The central protrusion 25 serves as a first location of the leverage member 21 and is associated operably with the actuating member 152. The leverage member 21 further has a second location adapted to be connected to a toy (not shown). Moreover, the distance between a bottom surface of the base plate 16 and the stop member 153 is shorter than a diameter of the ball member 14, thereby preventing removal of the ball member 14 from the sloping track face 132 during use.

Figure 3:
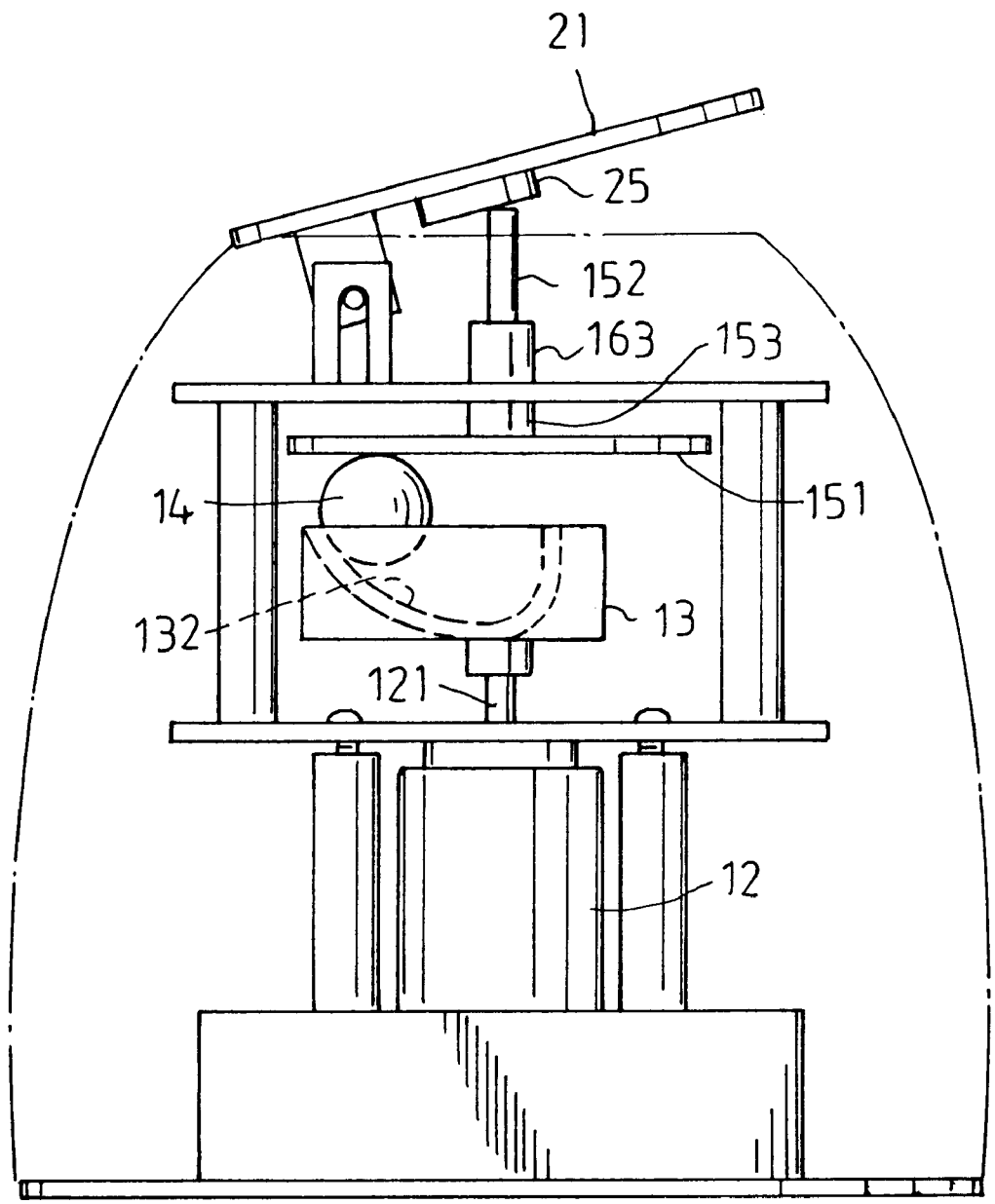
FIG. 3 is a schematic view of the first preferred embodiment in an actuating state.

With reference to FIG. 3, the motor 12 can be controlled by a circuit 10, such as a voice-responsive sensor circuit, to rotate the rotary body 13 via the output shaft 121, thereby generating a centrifugal force to move the ball member 14 from the first position toward the second position. The transmitting plate 15 is lifted by the ball member 14 in the direction parallel to the axis of the output shaft 121 with the assistance of the guiding sleeve 163. The actuating member 152 is moved upward to abut against the protrusion 25 of the leverage member 21 so as to swing the leverage member 21 upwardly relative to the fulcrum, thereby resulting in a power output at the second location of the leverage member 21 for initiating motion of the toy. When the motor 12 ceases to be activated by the sensor circuit, the rotary body 13 will stop rotating, and the transmitting plate 15 and the leverage member 21 will return back to their original positions, as shown in FIG. 2.

Figure 4:
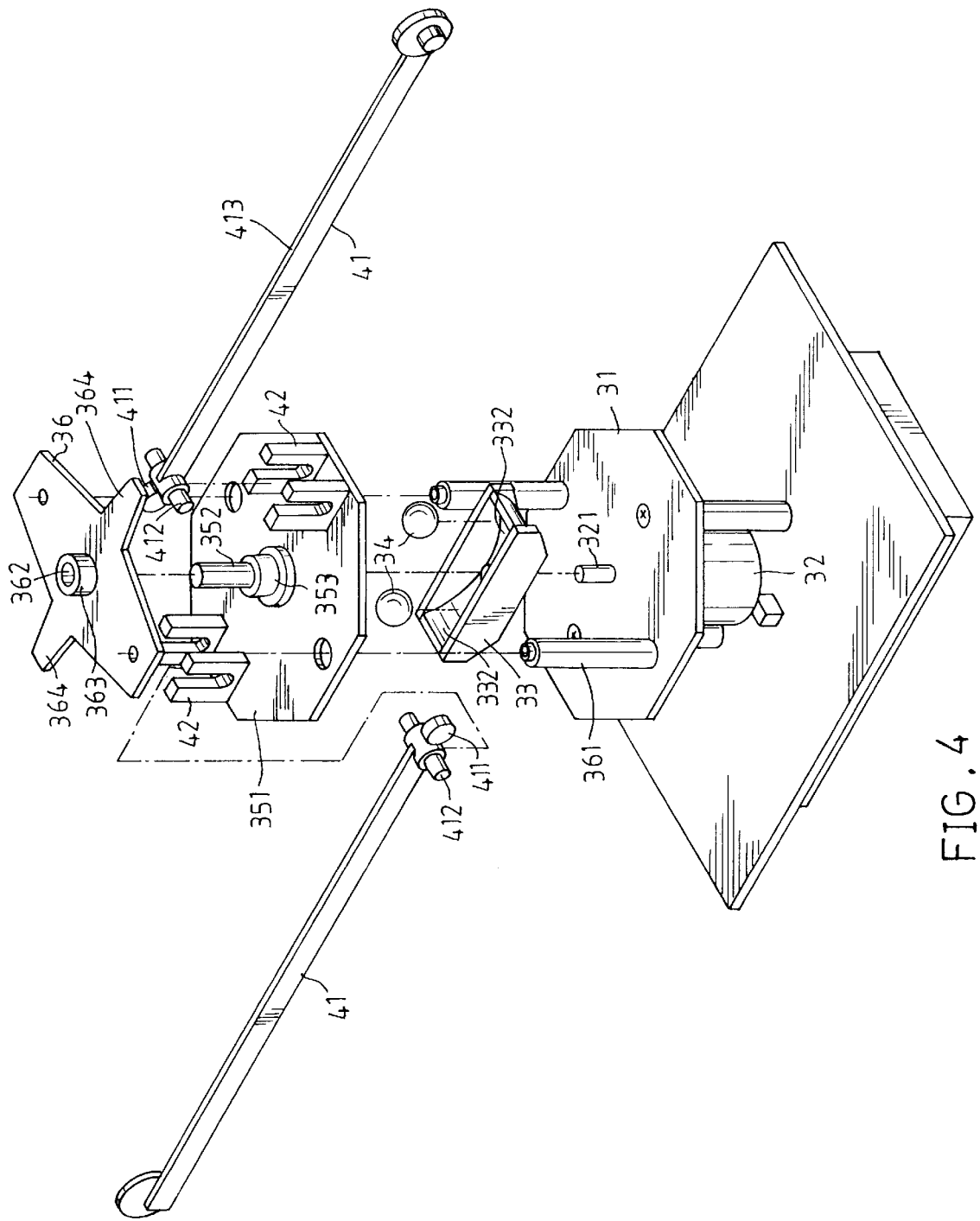
FIG. 4 is an exploded view of a second preferred embodiment of a leverage mechanism actuating device according to this invention.
Figure 5:
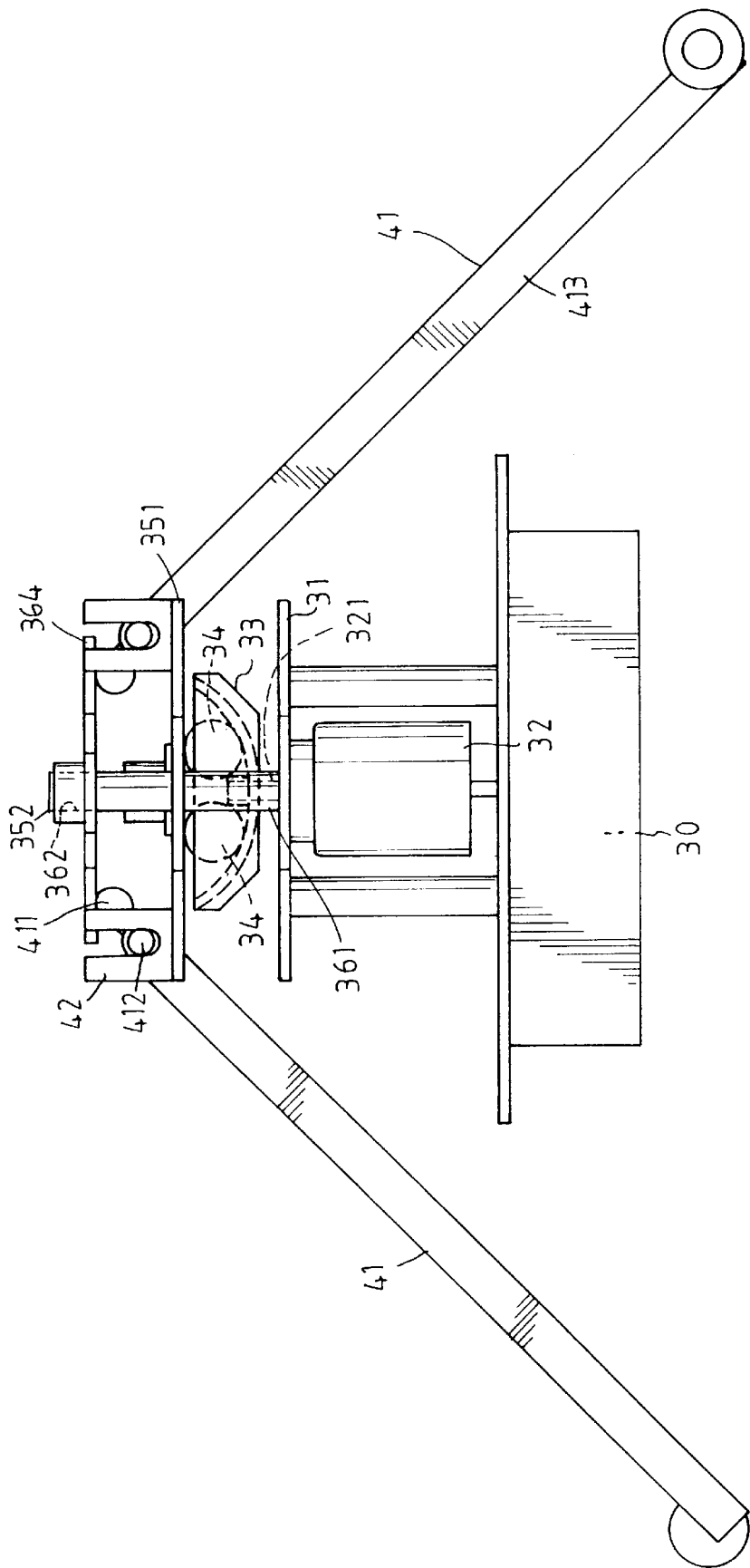
FIG. 5 is a schematic view of the first preferred embodiment.

Referring to FIGS. 4 and 5, the second preferred embodiment of the leverage mechanism actuating device of this invention is shown to comprising a drive member, a centrifuging mechanism, and a leverage mechanism. The drive member has a base seat 31, and a motor 32 with an output shaft 321 passing through the base seat 31. At least two support stems 361 are disposed on and extend upwardly from the base seat 31 to connect securely with a resisting member 36 of the leverage mechanism. The centrifuging mechanism includes a rotary body 33 which is disposed above the base seat 31 and which has two arcuate sloping track faces 332. Each sloping track face 332 has a lower end adjacent to the center of the rotary body 33 and an upper end. Two ball members 34 are disposed rollingly on the sloping track faces 332, respectively, such that the ball members 34 are moved by virtue of centrifugal force to the upper ends.

The leverage mechanism is disposed above the rotary body 33, and has a transmitting plate 351, an actuating member 352 which extends upwardly from the transmitting plate 351 at the center of the plate 351 along a direction parallel to the axis of the output shaft 321, a stop member 353 which is sleeved on the actuating member 352, and two engaging seats 42 which are disposed on the transmitting plate 351 at two opposite sides of the actuating member 352. The resisting member 36 is disposed above the transmitting plate 351, and has a center hole 362 for passage of the actuating member 352, a guiding sleeve 363 which is disposed at the center hole 362, and two resisting portions 364 which are disposed at two opposite sides of the center hole 362. The leverage mechanism further has two leverage members 41. Each leverage member 41 has an axial shaft 412 which extends transverse to the direction of the axis to divide the leverage member 41 into first and second locations 411,413, and which engages the respective one of the engaging seats 42 to form a fulcrum.

Figure 6:
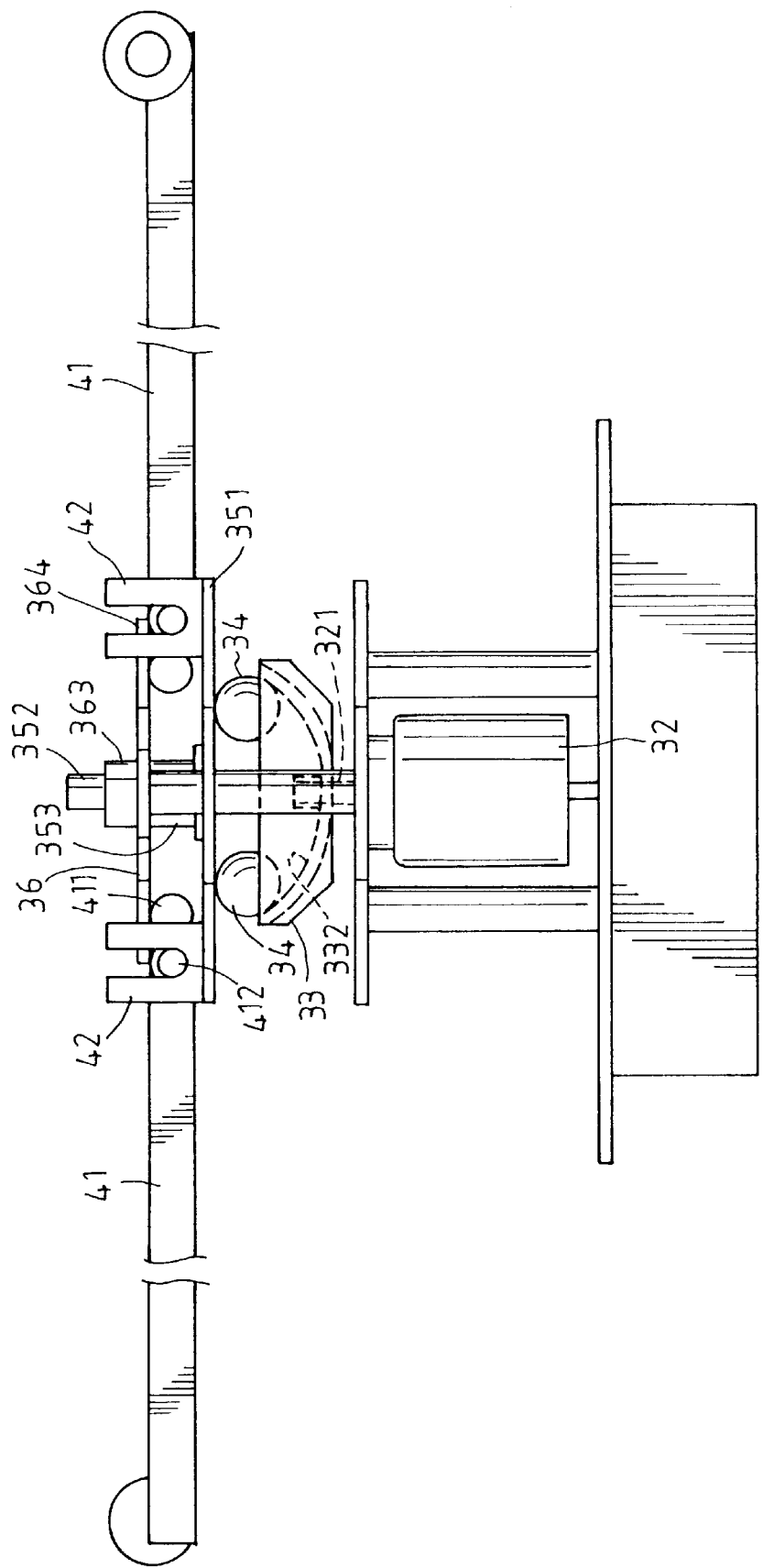
FIG. 6 is a schematic view of the first preferred embodiment in an actuated state.

With reference to FIG. 6, the motor 32 can be started by a sensor circuit 30 to rotate the rotary body 33 and generate a centrifugal force to move the ball members 34 from the lower ends of the sloping track faces 332 toward the upper ends, respectively. The transmitting plate 351 is lifted by the ball member 34 in the direction parallel to the axis of the output shaft 321 with the guidance of the guiding sleeve 362 so that the first locations 411 are moved upward to abut against the resisting portions 364 of the resisting member 36 so as to swing upwardly the second locations 413 around the fulcrum, thereby resulting in a power output at the second locations 413 for initiating motion of the toy. When the motor 32 ceases to be activated by the sensor circuit, the rotary body 33 will stop rotating, and the ball members 34 will move back to the lower ends. As such, the transmitting plate 35 will return back to its original position, and the first locations 411 of the leverage member 41 will be released from abutting against the resisting member 36.

As illustrated, the actuating device according to this invention applies a centrifugal force generated by the rotary body 13,33 to the ball member 14,34 so as to convert the same into a translational lifting force that is imparted to the leverage mechanism, thereby actuating the leverage mechanism so as to result in a power output at the leverage mechanism for initiating motion of a toy.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A leverage mechanism actuating device for use in initiating motion of a toy, comprising:

a drive member having an output shaft that defines an axis;

a centrifuging mechanism comprising a rotary body disposed transverse to and driven rotatably by said output shaft around said axis, and a force transmission member moved relative to said rotary body between a first position and a second position radially spaced from said first position by a centrifugal force generated by a rotary driving force applied by said output shaft on said rotary body, movement of said force transmission member from said first position to said second position enabling said force transmission member to convert the rotary driving force into a translational lifting force in a direction parallel to said axis, said rotary body being disposed above said drive member, and having a sloping track with a lower end to define said first position and an upper end opposite to and extending upwardly from said lower end to define said second position, said force transmission member comprising a ball member disposed rollingly on said sloping track such that said ball member is moved by virtue of the centrifugal force to said upper end so as to impart the translational lifting force; and a leverage mechanism including a fulcrum and first and second locations, said first location being associated operably with said force transmission member, said second location being adapted to be connected to the toy, said first location being actuated by the translational lifting force of said force transmission member to result in a power output at said second location for initiating the motion of the toy.

2. The leverage mechanism actuating device of claim 1, further comprising a transmitting plate disposed between said rotary body and said leverage mechanism, and movable upwardly in a direction parallel to said axis by lifting movement of said ball member so as to transmit the translational lifting force to said leverage mechanism.

3. The leverage mechanism actuating device of claim 2, wherein said leverage mechanism further comprises a base plate mounted fixedly relative to said axis in said direction parallel to said axis above said transmitting plate, and a leverage member disposed pivotally on said base plate to form said fulcrum, said first and second locations being defined on said leverage member;

said transmitting plate being provided with an actuating member extending upwardly therefrom so as to abut against said leverage member at said first location for actuating said leverage member around said fulcrum when said transmitting plate is moved upwardly.

4. The leverage mechanism actuating device of claim 2, wherein said leverage mechanism further comprises a leverage member disposed pivotally on said transmitting plate to form said fulcrum, said first and second locations being defined on said leverage member; and a resisting member mounted fixedly relative to said axis in said direction parallel to said axis above said transmitting plate so as to abut against said leverage member at said first location to swing upwardly said second location around said fulcrum when said leverage member is moved upwardly by upward movement of said transmitting plate.

5. The leverage mechanism actuating device of claim 2, further comprising a guiding mechanism for guiding upward movement of said transmission plate along said direction parallel to said axis.

* * * * *